Patented May 8, 1951

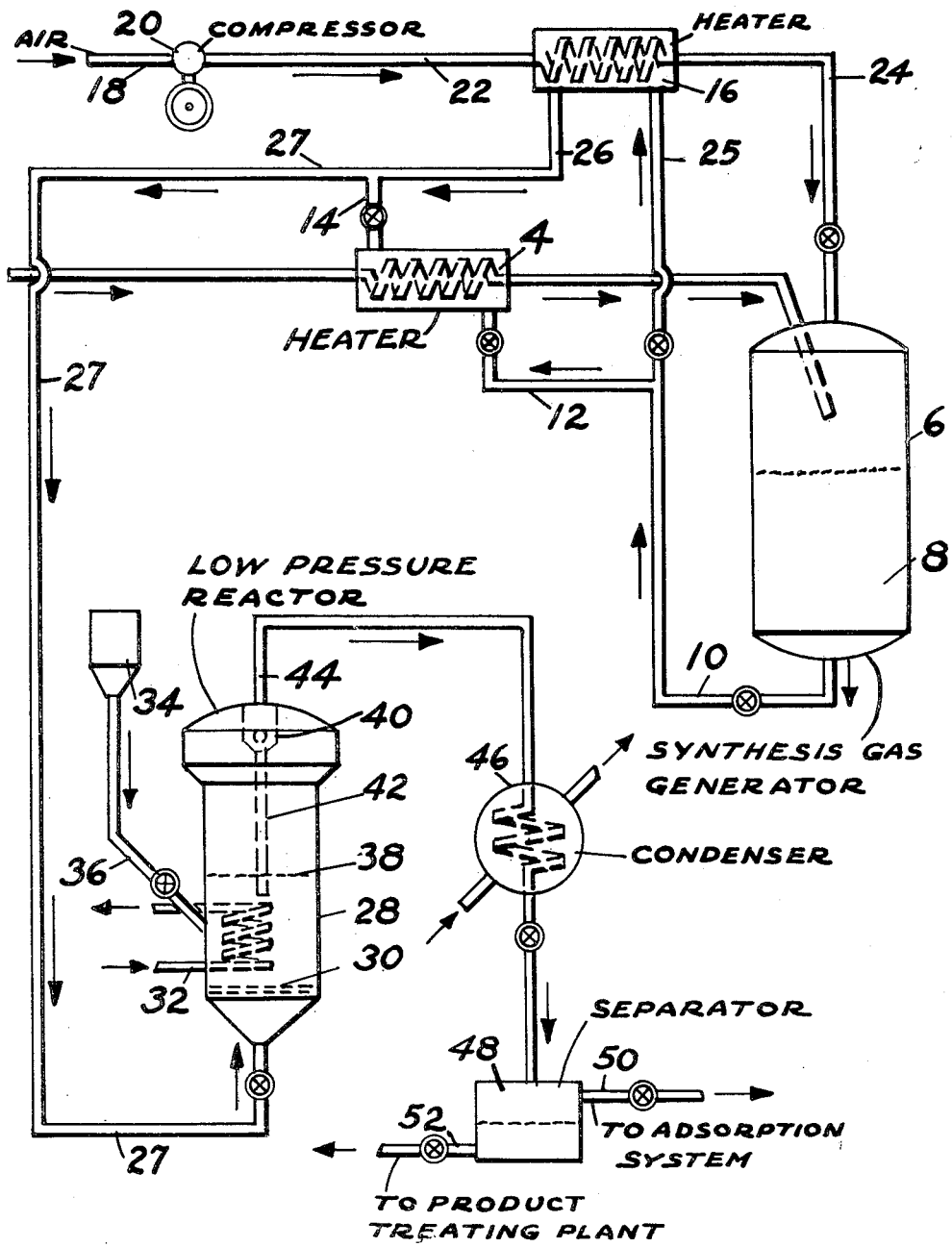

2,552,308

UNITED STATES PATENT OFFICE 2,552,308

LOW-PRESSURE HYDROCARBON SYNTHESIS PROCESS

Fred J. Buchmann and Alexis Voorhies, Jr., Baton Rouge, La., assignors to Standard Oil Development Company, a corporation of Delaware Application June 16, 1949, Serial No. 99,378

6 Claims. (Cl. 260—449.6)

The present invention relates to the catalytic reaction between carbon monoxide and hydrogen to form valuable liquid hydrocarbons. More particularly, the present invention is concerned with improvements in the reaction based on an improved composition of catalyst employed in the reaction.

The synthetic production of liquid hydrocarbons from gas mixtures containing various proportions of carbon monoxide and hydrogen is a matter of record, and numerous catalysts, usually containing an iron group metal, have been described which are specifically active in promoting the desired reactions at certain preferred operating conditions. For example, cobalt supported on an inert carrier is used when relatively low pressures of about 1 to 5 atmospheres and low temperatures of about 300 to about 425° F. are applied in the manufacture of a substantially saturated hydrocarbon product while at higher temperature of 450°–750° F. and higher pressures of 15–40 atmospheres required for the production of unsaturated and branch chained products of high antiknock value, iron type catalysts are more suitable.

In both cases, the reaction is strongly exothermic and the utility of the catalyst declines steadily in the course of the reaction chiefly due to deposition of non-volatile conversion products such as paraffin wax, carbon, and the like on the catalyst.

The extremely exothermic character and high temperature sensitivity of the synthesis reaction and the relatively rapid catalyst deactivation have led, in recent years, to the application of the fluid solids technique wherein the synthesis gas is contacted with a turbulent bed of finely divided catalyst fluidized by the gaseous reactants and products. This technique permits continuous catalyst replacement and greatly improves heat dissipation and temperature control.

Most processes for synthesis of hydrocarbons from synthesis gas obtained from coal or natural gas involve the production of relatively pure oxygen for the partial combustion of these raw materials to form CO and $H_2$ which are then reacted in a second step to form the desired hydrocarbons. In order to produce a highly unsaturated hydrocarbon product of high octane value, it is generally considered desirable to operate the synthesis reaction at high pressures of about 400 p. s. i. g. in the presence of an iron catalyst. This, however, involves production of relatively pure oxygen, also at high pressures. It would be uneconomic to employ air at high pressure rather than oxygen, because the recycle requirements associated with an iron catalyst to obtain high overall consumption of $H_2$ and CO would result in the undesirable recirculation of a gas containing an ever-increasing amount of nitrogen.

As indicated above, it would be highly desirable to operate a hydrocarbon synthesis process by the fluid solids technique wherein the synthesis gas is prepared at lower pressures by air instead of by oxygen at high pressures, and wherein the synthesis itself is carried out at moderate instead of at high pressures, and wherein a valuable olefinic motor fuel is obtained. The art shows many attempts in this direction in fixed bed processes. Thus it has been attempted to prepare high octane motor fuel using a thoria promoted cobalt on silica gel catalyst. However, it was found that when the variables were adjusted in an effort to improve the liquid yield and quality of the product, the yield of liquid products increased somewhat with pressure when the temperature was held constant, but the yield of wax increased also. This is quite undesirable because wax formation renders it extremely difficult to maintain a fluidized bed in the reactor. On the other hand, if the pressure is held constant in the relatively low pressure areas where cobalt catalyst functions well, that is, in the region of 15 to about 75 p. s. i. g., the olefin content of the product is low, and attempts to increase the olefinicity by increasing the temperature caused a decrease in liquid product yield and an increase in gas formation.

On the other hand, experience has indicated that operation with a conventional iron catalyst at the lower pressures is usually accompanied by severe carbonization of the catalyst as well as by heavy formation of wax, both making the maintenance of a fluid catalyst bed a very great difficulty. Carbonization further causes rupture of iron catalysts resulting in formation of fines which eventually make impossible maintenance of fluidization and control of temperature.

It is the principal object of the present invention to provide an improved hydrocarbon synthesis process operable at moderate pressures wherein high yields of valuable liquid synthesis products having a high degree of unsaturation are obtained and wherein wax formation is minimized.

It is also an object of the present invention to provide a combination process wherein air at low pressures rather than oxygen at elevated pressures may be employed in the preparation of hydrocarbon synthesis gas which in turn is converted at relatively low pressures into liquid hydrocarbons of high antiknock properties, wax formation being minimized therein.

Other objects of the invention will in part be obvious and will in part appear hereinafter.

In the synthesis of hydrocarbons from carbon monoxide and hydrogen, particularly wherein the synthesis gas contains large quantities of nitrogen, it is obvious that a once-through operation is most desirable, because otherwise large quanties of inert material would be recycled, markedly decreasing the capacity of the plant and the operation. Such nitrogen is present when the synthesis gas is prepared by partial combustion of natural gas with air at moderate pressures, which is of marked economic advantage over preparing the same by combustion with pure oxygen under pressure. Furthermore, in the synthesis of hydrocarbons from CO and $H_2$ employing a once-through operation, it is apparent that the optimum consumption ratio of the reactants should be the same as their ratio in the synthesis feed gas.

In the production of synthesis gas by partial oxidation with air of methane and natural gas, hydrogen and CO are produced at a 2/1 ratio. When such a gas is used as a feed to the synthesis reactor, the elimination of oxygen in the form of water rather than carbon dioxide is essential for an approximately 2/1 $H_2$/CO consumption ratio, in accordance with the reaction, (1) $\quad 2nH_2 + nCO \rightarrow (CH_2)_n + nH_2O$ This is essentially the course of the reaction when cobalt is employed as a synthesis catalyst, and is thus ideally suited for a once-through operation. However, as indicated above and as is well known, cobalt catalyst is not conducive to formation of olefinic hydrocarbons valuable as motor fuel. On the other hand in some cases, when an iron catalyst is employed, the over-all reaction can be more nearly represented by (2) $\quad 3nH_2 + 3nCO \rightarrow 2(CH_2)_n + nH_2O + nCO_2$ The $CO_2$ that occurs along with the products of the synthesis reaction, as in (2) above, may be a result of the reversible water gas shift reaction (3) $\quad CO + H_2O \rightleftharpoons CO_2 + H_2$ Thus in the synthesis reaction according to (1) above, the consumption ratio of hydrogen to carbon monoxide is 2/1. However, since some of the water formed in (1) may react with some unconverted CO in accordance with (3), hydrogen is formed and CO is consumed which in effect lowers the $H_2$/CO consumption ratio. Carried to its limit, the ultimate effect of this reaction would be for all of the $H_2O$ formed to react rapidly and irreversibly with CO in which the net synthesis reaction could be written as (4) $\quad nH_2O + 2nCO \rightarrow (CH_2)_n + nCO_2$ giving an $H_2$/CO consumption ratio of 0.5/1. From the above it may be seen that, starting with a 2/1 $H_2$/CO feed gas, the $H_2$/CO consumption ratio may vary from about 2/1 to almost 0.5/1 depending upon the degree to which the water gas shift reaction takes place.

During the normal synthesis with an iron catalyst, and iron is considered to be an excellent shift catalyst, the water gas constants, $$K = \frac{(CO_2)(H_2)}{(CO)(H_2O)}$$

calculated from the concentrations of the water gas components in the effluent from the reactor are 69–95% of the known water-gas equilibrium constants at temperatures in the range of 550°–650° F. The known values for K at 550° F. and at 650° F. are about 50 and 23 respectively. The low calculated values indicate that the amounts of $CO_2$ and $H_2$ present are inadequate to satisfy the water gas shift equilibrium and that the reaction of CO and $H_2O$ is slower than the synthesis reaction.

In a once-through hydrocarbon synthesis operation at low pressures in the range of about 50 to 100 p. s. i. g. with fluidized catalyst of prepare high yields of olefinic motor fuel, it is, therefore, highly desirable that the $H_2$/CO consumption ratio approach as nearly as possible to the ratio in which these two constituents are present in the feed. It is the purpose of the present invention to provide a catalyst for this type of process which will give good yields of olefinic material at low pressures, which will control the $H_2$/CO consumption ratio to enable a once-through operation to be economically performed, which will give a gasoline product with minimum quantities of wax, and which will be resistant to disintegration in the fluidized state.

It has now been found that the objects and advantages of the invention may be realized by employing in a once-through low pressure hydrocarbon synthesis process an iron catalyst supported on an activated carbon support and promoted by a critical and small amount of alkali metal salt promoter. Slight variations in catalyst promoter content on either side cause decrease either in olefin content of the product, activity of the catalyst, increase in wax production, and decrease in consumption ratio of $H_2$/CO. The features of the present invention cooperate to produce a novel and useful process.

The invention will best be understood by referring to the accompanying diagrammatic representation of a modification of the present invention, wherein equipment and flow of material suitable for carrying out a preferred embodiment of the invention are illustrated.

Referring now in detail to the drawing, natural gas from any convenient source preheated in preheater 4 is passed to synthesis gas producer vessel 6, which comprises a catalytic oxidation zone. Simultaneously, air is passed through line 18 into compressor 20, wherein it is moderately compressed to about 50–100 p. s. i. g. and the compressed material is passed through line 22 and preheater 16, wherein it is preheated to about 1200° F., and introduced into synthesis generation plant 6. In generator 6 partial oxidation mainly to CO and $H_2$ takes place. The temperature in the oxidation zone may be of the order of 2000–2500° F., the lower portion 8 of generator 6 may comprise a catalytic reformer bed, containing a reforming catalyst such as nickel or copper on magnesia, and any $CO_2$ and $H_2O$ formed as a result of combustion in the upper part of the generator will reform unreacted methane to produce further quantities of $H_2$ and CO.

The hot synthesis gases leaving generator 6, which are at a temperature of about 1600–1800° F. are passed through line 10 and are preferably employed to preheat the incoming natural gas and air in preheaters 4 and 16, respectively, the synthesis gas stream being divided for this purpose to pass through lines 12 and 14, and through lines 25 and 26. The reunited synthesis gas stream in line 27, which has been cooled as indicated to about 450° to 600° F., and may be further cooled if desired, is passed to the bottom of hydrocarbon synthesis reactor 28. The latter is preferably in the form of a vertical cylinder with a conical base and an upper expanded section, and has a grid (or screen) located in the lower section to effect good gas distribution.

Within reactor 28 a mass of the catalyst described below is maintained in the form of a finely divided powder having a particle size distribution from about 100–400 mesh, preferably about 150–250 mesh. The catalyst comprises reduced iron supported on an active carbon carrier promoted by not less than 0.4% and not more than 1% $K_2CO_3$ on the total weight. The weight of iron is preferably 10 to 20% of the total catalyst, and the iron is distributed uniformly on the catalyst by any desired process, such as impregnation, thermal decomposition of iron pentacarbonyl, etc. Thus for illustrative purposes, catalyst supplied to reactor 28 from catalyst hopper 34 through line 36 may have an iron content of about 10 to 20%, a carbon content (as carrier) of 79 to 89%, and a critical promoter content of 0.4 to 0.6% $K_2CO_3$.

The synthesis gas mixture, having a molar ratio of $H_2/CO$ of about 2 to 1, flows upwardly through grid 39. The superficial linear velocity of the gas within the reactor is kept within the approximate range of 0.1–3 feet per second, preferably about 0.4–1.5 feet per second so as to maintain the catalyst in the form of a dense, highly turbulent fluidized mass having a well defined upper level 38 and an apparent density of from about 30 to 125 lbs. per cubic foot, depending upon the fluidization conditions.

In accordance with the invention, the pressure within reactor 28 is kept within the approximate limits of 50 to 100 p. s. i. g., preferably about 55–75 p. s. i. g. and the temperature is maintained constant within the limits of about 550 to 650° F. Surplus heat from the exothermic reaction may be withdrawn by any conventional means, such as external cooling coil 32.

Only a small portion of the powdered catalyst is carried into the disengaging section of the reactor above level 38, and these catalyst particles are separated from the reaction products in a conventional gas-solids separator, such as cyclone 40 and returned to the dense bed via dip pipe 42. The rate of gas throughput in terms of volume of gas ($H_2+CO$) per weight of catalyst per hour, or v./hr./w., is in the range of 2 to 20, and is so adjusted as to give the desired conversion without need for any recycle of tail gas.

Product vapor and gases are withdrawn overhead from reactor 28 and are passed through line 44 and condenser 46 to liquid products separator 48, wherein liquid products are separated from gases. The liquid products, containing high yields of olefins with little or no wax may be withdrawn through line 52 for further processing, such as fractionation, cracking of the gas oil fraction, isomerization, polymerization, hydroforming, etc., all in a manner known per se.

The uncondensed gases, comprising lower molecular weight hydrocarbons as well as unreacted synthesis gas and nitrogen are preferably passed through line 50 to a fluidized solids active carbon adsorption plant, wherein light hydrocarbons may be removed and recovered by desorption at the lower pressures of the present operation. This represents a considerably more economical process than the conventional oil absorption of tail gas.

The present invention admits of numerous modifications apparent to those skilled in the art. Thus instead of producing synthesis gas from partial combustion of natural gas or methane by air at low pressures, synthesis gas may also be prepared by the water gas reaction from coal. In such case, depending how heat is furnished to the process, either by direct combustion of coke or coal within the water gas generator with air or by recycling of hot combustion solids from a burner vessel, the synthesis gas may or may not contain appreciable quantities of nitrogen. However, the ratio of $H_2/CO$ in synthesis gas prepared from coal is about 1/1, and such a synthesis gas may be passed through a shift converter to increase the feed gas ratio from about 1/1 to about 2/1. In such a system, also, a desulfurizing step would be introduced, such as the passing of the synthesis gases through spent synthesis catalyst to remove sulfur.

As for the catalyst, various modifications of the above type catalyst may show similar and further improvement in the synthesis reaction.

The invention may be further illustrated by the following specific examples, which represent fixed bed laboratory data obtained in using the critically promoted catalyst of the present invention.

*Example I*

The following example delineates the effect of regulating the promoter content upon the variables of product quality, $C_4+$ selectivity, catalyst activity, and olefin formation. In all cases, the catalyst contained 14.9% iron supported on an active carbon carrier. Reaction conditions for the once-through operations comprised a pressure of 75 p. s. i. g., 600° F. temperature, and a feed rate of 200 v./v./hr.

| | | | | |
|---|---|---|---|---|
| $K_2CO_3$, Per Cent | 0 | 0.5 | 2.0 | 4.0 |
| CO Conversion, Per Cent | 73 | 83 | 77 | 66 |
| Feed Gas Ratio, $H_2/CO$ | 1.15 | 1.15 | 1.15 | 1.15 |
| $H_2/CO$ Consumption Ratio | 0.78 | 0.62 | 0.55 | 0.54 |
| Water Gas "K," Per Cent of Equil. | 33 | 63 | 78 | 91 |
| Yield $C_4+$, cc./m.$^3$ $H_2+CO$ Cons. | 217 | 215 | 206 | 199 |
| Per Cent Unsats. in $C_3$ in Exit gas | 41 | 88 | 87 | 83 |
| Collected Oil Product, Appearance | Clear | Slightly Waxy | Very Waxy | Waxy |
| Oil Product, Init.—430° F., Wt. Per Cent | 90 | 72 | 66 | 58 |
| Est. Unsat. of Init. to 430° F., Per Cent | Less than 40 | 77 | 76 | 75 |

The above data indicate that the catalyst promoted with 0.5% $K_2CO_3$, although giving a somewhat lower $H_2/CO$ consumption ratio than the catalyst containing no promoter, gave a product whose unsaturate content was far greater than that of the unpromoted catalyst. Thus, whereas an unpromoted catalyst prepared as above gave a product whose unsaturation was less than 40% (not satisfactory for a motor fuel), the 0.5% $K_2CO_3$ promoted catalyst showed a product unsaturation of 77%. Furthermore, the last-named catalyst had high selectivity for $C_4+$ product, good activity for converting CO, and low wax production. Catalysts containing higher quantities of promoter showed considerably higher wax-forming tendencies, lower selectivities, and lower relative percentages of gasoline in the product, as well as substantially lower $H_2/CO$ consumption ratios.

Example II

Under the same operating conditions as in Example I, catalysts containing 0.1 and 0.3% K$_2$CO$_3$ were tested, employing as feed a synthesis gas containing H$_2$/CO in the ratio of 2.04 to 1 rather than 1.15 to 1.

| | | | |
|---|---|---|---|
| K$_2$CO$_3$, Per Cent | 0.1 | 0.3 | 0.5 |
| CO Conversion, Per Cent Output | 94 | 94 | 93 |
| H$_2$/CO Consumption Ratio, Output | 1.03 | 0.85 | 0.67 |
| Yield, cc. C$_4$+/m.³ H$_2$+CO Consumed | 142 | 205 | 214 |
| Unsats. in Exit Gas, Per Cent: | | | |
| C$_2$ | 7 | 51 | 77 |
| C$_3$ | 31 | 75 | 82 |
| Collected Oil Product: Est. Unsat. of Init. to 430° F., Per Cent | 11 | 46 | 70 |

Here again it may be seen that even a slightly lower promoter content the unsaturation of the gasoline product is very low, indicating again the criticality of the promoter content.

Thus in accordance with the invention, hydrocarbon synthesis operations may be operated at low pressures in the presence of a catalyst consisting of iron supported on an active carbon carrier and promoted with a critically small quantity of alkali metal salt promoter. Other promoters may be used, such as potassium hydroxide, potassium acetate and potassium fluoride. The important consideration is that since the promoter concentration is probably associated with the iron surface, the ratio of promoter content to iron surface is critical. Thus similar catalysts, of different particle size, and therefore of different iron surface area will have a different critical promoter content, depending upon the extent of iron surface area. By use of this critically promoted catalyst, high yields of valuable liquid unsaturated product are obtained with minimum quantities of wax. By dispensing with an oxygen unit and operating a synthesis gas generator with air, investment costs are substantially reduced.

While the foregoing description and exemplary operation have served to illustrate specific applications and results of the invention, other modifications obvious to those skilled in the art are within its scope.

What is claimed is:

1. An improved process for converting CO and H$_2$ to normally liquid hydrocarbons of high olefin content which comprises contacting CO and H$_2$ in synthesis proportions under synthesis conditions comprising pressures of from about 50 to about 100 p. s. i. g. with a dense turbulent fluidized mass of finely divided synthesis catalyst, said catalyst comprising an activated carbon support carrying as active component iron promoted with not less than 0.4 and not more than 1.0% by weight of the total catalyst, of an alkali metal promoter.

2. The process of claim 1 wherein said iron comprises from 10-20% of the total weight of said catalyst.

3. The process of claim 1 wherein said synthesis conditions include temperatures of from about 550°-650° F. and feed rates of about 2-20 v./hr./w.

4. An improved low-pressure once-through process for preparing high yields of valuable olefinic hydrocarbons from synthesis gas containing appreciable quantities of nitrogen which comprises passing a gas mixture containing H$_2$ and CO in synthesis proportions diluted with nitrogen into a hydrocarbon synthesis reaction zone, contacting said gaseous mixture with a dense turbulent mass of finely divided synthesis catalyst consisting of an activated carbon support, said support carrying as active component from 10-20% by weight of the total catalyst, of iron promoted with 0.4-1.0% of a potassium compound promoter, maintaining a pressure of about 50-100 p. s. i. g. and a temperature of about 550°-650° F. within said zone, and withdrawing a product containing high yields of liquid olefinic hydrocarbon product.

5. The process of claim 4 wherein said catalyst is promoted with 0.5 weight percent potassium carbonate based on the total weight of catalyst, said catalyst contains 14.9% iron, and reaction conditions within said zone comprise a pressure of about 75 p. s. i. g. and a temperature of about 600° F.

6. The process of converting natural gas to valuable liquid olefinic hydrocarbons in a low pressure once-through operation which comprises oxidizing natural gas with air in an oxidation zone to form synthesis gas containing H$_2$ and CO in a ratio of about 2/1, and which gas is diluted with nitrogen, passing said gas to a hydrocarbon synthesis zone, contacting said gas with a fluidized catalyst comprising an activated carbon support carrying an iron catalyst promoted with about 0.5 weight percent K$_2$CO$_3$ based on the total weight of said catalyst, said iron comprising about 15% by weight of the total catalyst, maintaining a pressure of about 75 p. s. i. g. and a temperature of about 600° F. within said zone, and withdrawing a product containing high yields of liquid olefinic hydrocarbons.

FRED J. BUCHMANN.
ALEXIS VOORHIES, Jr.

REFERENCES CITED

The following references are of record in the file of this patent:

UNITED STATES PATENTS

| Number | Name | Date |
|---|---|---|
| 1,801,382 | Wietzel | Apr. 21, 1931 |
| 2,231,990 | Dreyfus | Feb. 18, 1941 |
| 2,244,196 | Herbert | June 3, 1941 |
| 2,257,293 | Dreyfus | Sept. 30, 1941 |
| 2,271,259 | Herbert | Jan. 27, 1942 |
| 2,326,799 | Pier | Aug. 17, 1943 |